Patented June 24, 1941

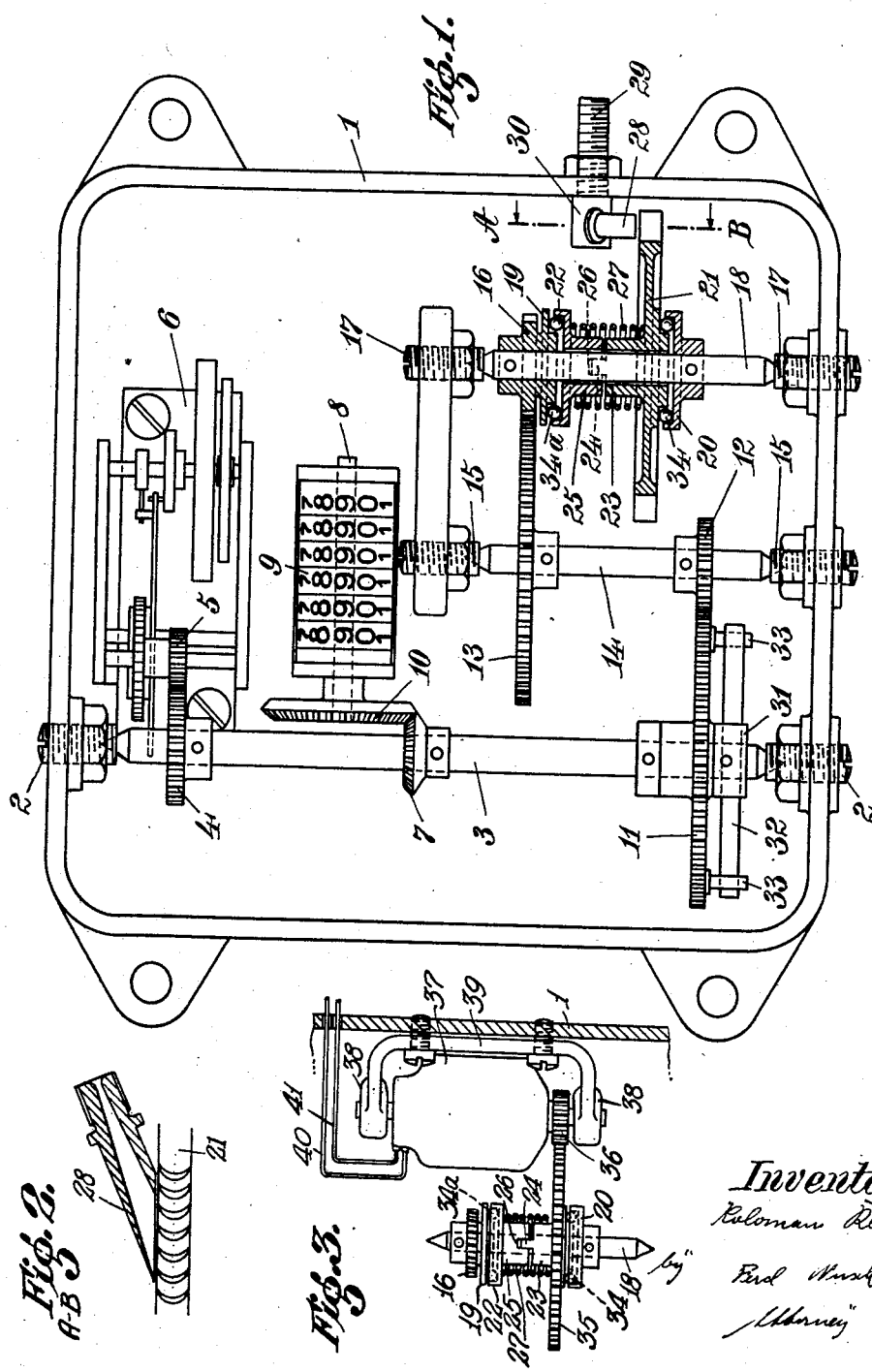

2,246,538

UNITED STATES PATENT OFFICE 2,246,538

DRIVING DEVICE FOR THE TRANSMISSION OF POWER BY ROLLING ELEMENTS, ESPECIALLY FOR DRIVING TIMING MECHANISMS OF TACHOMETERS

Koloman Rezsny, Budapest, Hungary

Application June 13, 1939, Serial No. 278,924
In Hungary May 31, 1935

2 Claims. (Cl. 161—15)

This invention relates to a driving device for the timing mechanism of tachometers and to measuring or recording devices in general, which indicate what performances take place in a certain period of time.

The drive of such timing mechanisms is effected according to the invention in that a rotor, continually driven by a source of energy with excess of power, drives the timing mechanism equipped to take up only a certain output in a unit of time, by means of rolling elements so arranged that the rolling resistance between the rotor and the timing mechanism acts exclusively as power transmission.

The invention renders such mechanism free from the use of winding springs. Because this driving device substitutes the power of a rotor for that of the winding springs hitherto used, it is independent of human influences as it is not wound by hand. Consequently, this driving device is particularly suitable in cases where, for example in industrial plants, the task is given to fulfill a certain purpose by a strong timing mechanism, for example to control the measuring mechanism of a tachometer or to drive a timing mechanism or to operate a recording band for the whole working period during which something is performed.

The invention enables in suitable instances even the drive by the fluid (steam, compressed air or the like) which has actually to be controlled. Thus, the driving power for this high speed motor of a timing mechanism is supplied for example in the case of a compressor plant, by a small air turbine fed from the compressor plant, in a steam boiler plant by a small steam turbine, in a pumping station for example by a small Pelton-turbine and in an electricity plant by a small electric motor. The vacuum produced may also serve as driving medium, for example in that the air is drawn through a small nozzle in front of the air turbine taking the place of the winding spring. Of the large number of possibilities which cannot be enumerated separately, all solutions come within the scope of the invention, in which a high speed mechanical element driven by a fluid or electric current and taking the place of the winding springs imparts a slow rotary movement to the shaft of a timing mechanism by interposed balls or rollers.

The exclusive use of rolling friction according to the invention for driving the timing mechanism only taking up a certain output in a unit of time renders the device independent of fluctuations in the source of driving energy, for example a turbine.

Two of the many possible embodiments of the invention are illustrated by way of example in the accompanying drawing, in which:

Fig. 1 is an elevation and part section of a timing meter, whose timing mechanism or movement is driven by an air turbine, Fig. 2 is a diagrammatic sectional view of the air turbine, Fig. 3 is a part elevation of a construction of the timing meter driven by a small electric motor.

A so-called time shaft 3 is mounted in a casing 1 between bearing screws 2, 2 (Fig. 1). The time shaft carries a toothed wheel 4 which meshes with a toothed wheel 5 of a so-called anchor escapement 6 or the like, which ensures regular movement of the time shaft 3.

The time shaft 3 also carries a bevel wheel 7 which meshes with a bevel wheel 10 keyed on shaft 8 of a counting mechanism 9 so that the number of rotations of the time shaft 3 is transmitted to the counting mechanism to enable the time of movement of the time shaft to be ascertained.

A large toothed wheel 11 sits loosely on the time shaft 3 and meshes with a small toothed wheel 12 keyed on a counter shaft 14 mounted in bearing screws 15. This counter shaft 14 also carries a large toothed wheel 13 cooperating with a small toothed wheel 16 keyed on a driving rotor shaft 18 mounted between bearing screws 17. This shaft 18 extends freely through the high speed air turbine 21 and counter element 25.

The toothed wheel 16 is made in one piece with a disc 19 keyed on the shaft 18.

A disc 20 is keyed on the shaft 18.

Between the two discs 19 and 20 the two above mentioned elements that is the turbine 21 and counter element 25 and also a disc 22 are located. Balls 34 and 34a are arranged between the disc 20 and turbine 21 and between the two discs 19 and 22 respectively, so that only the rolling friction of the balls acts between these parts. This friction is sufficient for driving the timing mechanism, as has been proved in practice.

The hub 23 of the turbine 21 has a tongue 24 and the counter element 25 has an incision 26 in which the tongue 24 engages so that the turbine 21 and the counter element 25 always rotate together yet are independent of one another in axial direction. The turbine 21 and the counter element 25 are held apart by a pressure spring 27 and pressed against the balls 34 and 34a respectively and consequently directly against the discs 20 and 19 respectively.

In, for example, a compression plant to be controlled, compressed air flows through the conduit 29, nozzle holder 30 and nozzle 28 on to the turbine 21 (see also Fig. 2), this turbine is set in rotation. By the rolling friction produced under the action of the pressure spring 27 by the balls 34 and 34a between the parts 20 and 21 and 19 and 22 respectively, rotary movement is imparted to the turbine shaft 18 and through the intermediary of the gear wheels 16, 13, 12, 11 to the time shaft 3.

To enable the time shaft to follow intermittently the movement of the anchor escapement without retardation, separate accumulating springs known in watchmaking are arranged on the time shaft, for example in the following manner:

The toothed wheel 11 sits loosely on the time shaft 3 and a thin flat spring 32 extends through the set ring 31 and bears against two pins 33 on the wheel 11. As a result of this construction the live force of the driving parts is accumulated by the accumulating spring 32 at the moment when the time shaft is arrested by the anchor escapement, and, when the time shaft is again released, the sudden jump of the time shaft is caused merely by the accumulated spring force. The accumulating spring is tensioned directly by the high speed turbine 21. The accumulating spring might be arranged in the escapement wheel of the anchor escapement 6. It is evident, that the accumulating spring may be of various shapes, it may consequently be a tension or compression helical spring.

Although the turbine 21 as driving rotor has a high speed of rotation, its shaft 18 runs relatively slowly so that its bearings may be of very simple construction.

In the form of construction shown in Fig. 3 a high speed toothed wheel 35 is used instead of the turbine wheel and meshes with a small toothed wheel 36 of an electric motor 37. The shaft of the electric motor is journalled at its upper and lower ends in bearings 38 secured to the casing wall 1 with the motor housing by means of a bracket 39. Electric current is fed to the electric motor 37 by the wires 40, 41 and the motor drives the above described time movement by means of the toothed wheel 36. In all other respects the arrangement corresponds to that illustrated in Fig. 1; only the toothed wheel 35 is substituted for the turbine wheel 21. In this instance the toothed wheel 35 is the driving element running at a high speed.

The scope of the invention will not be altered if some kinds of roller bearings or the like are used instead of ball bearings for mounting the high speed driving element or rotor.

I claim:

1. A driving device with power transmission by rolling elements, especially for driving the timing mechanism for tachometers of the type in which a rotor driven by a source of energy with excess of power is combined with a timing mechanism capable of taking up only a predetermined output in a unit of time and with rolling elements between said rotor and said timing mechanism for transmitting the movement of said rotor to said timing mechanism by rolling friction, comprising in combination with the rotor, a counter-element positively connected for rotation with but axially shifted relative to the rotor, a spring pressing apart said rotor from said counter-element, a driving shaft of the timing mechanism, two shoulders on said shaft, two sets of freely rolling bodies arranged between the rotor and the timing mechanism on the facing sides of said shoulders, one set of rolling bodies pressed against the rotor and the other set against said counter-element by said spring.

2. A driving device as specified in claim 1, in which the shoulders and the sets of freely rolling bodies are constructed as bearings for the rotor and for the counter-element.

KOLOMAN REZSNY.